(12) United States Patent
Takai

(10) Patent No.: US 9,440,322 B2
(45) Date of Patent: Sep. 13, 2016

(54) OBJECT POSITIONING AND FIXING DEVICE

(71) Applicant: PASCAL ENGINEERING CORPORATION, Hyogo (JP)

(72) Inventor: Hiroaki Takai, Hyogo (JP)

(73) Assignee: Pascal Engineering Cooperation, Hyogo (JP)

( * ) Notice: Subject to any disclaimer, the term of this patent is extended or adjusted under 35 U.S.C. 154(b) by 0 days.

(21) Appl. No.: 14/372,152

(22) PCT Filed: Feb. 13, 2013

(86) PCT No.: PCT/JP2013/053352
§ 371 (c)(1),
(2) Date: Jul. 14, 2014

(87) PCT Pub. No.: WO2013/140897
PCT Pub. Date: Sep. 26, 2013

(65) Prior Publication Data
US 2015/0108311 A1      Apr. 23, 2015

(30) Foreign Application Priority Data

Mar. 23, 2012  (JP) .................................. 2012-068009
Apr. 17, 2012  (JP) .................................. 2012-093457

(51) Int. Cl.
*B23Q 3/18*       (2006.01)
*B23Q 3/06*       (2006.01)
*B23Q 1/00*       (2006.01)

(52) U.S. Cl.
CPC ............. *B23Q 3/186* (2013.01); *B23Q 1/0063* (2013.01); *B23Q 1/0072* (2013.01); *B23Q 1/0081* (2013.01); *B23Q 3/06* (2013.01); *B23Q 3/18* (2013.01); *B23Q 3/183* (2013.01)

(58) Field of Classification Search
CPC .......... B23Q 3/18; B23Q 3/06; B23Q 3/183; B23Q 3/186; B23Q 1/0063; B23Q 1/0072; B23Q 1/0081
See application file for complete search history.

(56) References Cited

U.S. PATENT DOCUMENTS 4,445,675 A * 5/1984 Kitaura .................. B25B 5/061
                                                           269/20
5,630,577 A    5/1997 Tankersley
(Continued)

FOREIGN PATENT DOCUMENTS

AT  EP 0873815 A2 * 10/1998  ............... B23Q 3/06
DE  198 26 328        11/1999
(Continued)

*Primary Examiner* — Eret McNichols
(74) *Attorney, Agent, or Firm* — Norris McLaughlin & Marcus, P.A.

(57) ABSTRACT

In an object positioning and fixing device that positions and fixes a work pallet on a base member: a reference seating surface is formed on the base member; a contacting surface is formed on the work pallet; fitting cylindrical portions of a plurality of reference members are fixed in a plurality of fitting holes in the base member; a plurality of annular engagement members are installed in the work pallet; each of the reference members has an engagement projection; a base end contacting surface of the base end of the engagement projection is brought into contact with the reference seating surface so as to set the height position of the engagement projection; and the annular engagement member engaged over the outside of the engagement projection is elastically deformed in the radially outward direction so that it tightly contacts against the tapered engagement surface.

13 Claims, 18 Drawing Sheets

(56) References Cited

U.S. PATENT DOCUMENTS

| | | | | |
|---|---|---|---|---|
| 6,024,354 | A * | 2/2000 | Yonezawa | B23Q 1/0081 269/309 |
| 6,527,266 | B1 * | 3/2003 | Yonezawa | B23Q 1/0081 269/309 |
| 7,758,031 | B2 * | 7/2010 | Yonezawa | B23Q 1/009 269/309 |
| 8,087,650 | B2 * | 1/2012 | Kuroda | B23Q 1/009 269/263 |
| 2004/0046302 | A1 * | 3/2004 | Bernhard | B23B 31/107 269/309 |
| 2008/0061486 | A1 * | 3/2008 | Kuroda | B23Q 3/183 269/48.1 |
| 2010/0308524 | A1 * | 12/2010 | Kitaura | B23Q 1/0081 269/309 |
| 2013/0043634 | A1 * | 2/2013 | Kitaura | B23Q 3/183 269/309 |

FOREIGN PATENT DOCUMENTS

| | | | |
|---|---|---|---|
| DE | 19826328 C1 * | 11/1999 | ........... B23Q 1/0063 |
| EP | 0263476 A2 * | 4/1988 | ........... B23Q 1/4804 |
| JP | 4-17037 | 2/1992 | |
| JP | 11-508493 | 7/1999 | |
| JP | WO 03009964 A1 * | 2/2003 | ........... B23Q 1/0081 |
| JP | WO 03027511 A1 * | 4/2003 | ........... B23Q 1/0081 |
| JP | 2003-181730 | 7/2003 | |
| JP | 2004-148463 | 5/2004 | |
| JP | WO2004067224 A1 * | 8/2004 | |
| JP | 2008-183651 | 8/2008 | |
| JP | 2011-251376 | 12/2011 | |
| WO | WO-97/01416 | 1/1997 | |
| WO | WO-2011/105208 | 9/2011 | |

* cited by examiner

OBJECT POSITIONING AND FIXING DEVICE

TECHNICAL FIELD

The present invention relates to an object positioning and fixing device that positions and fixes a target object on a base member in the horizontal direction and in the vertical direction, and in particular relates to such a device that is capable of fixing the target object by driving a plurality of bolts for clamping to perform clamping therewith.

BACKGROUND OF THE INVENTION

From the prior art, work pallets of various types (i.e. a target object) for holding a workpiece to be supplied to machining processing, and work pallet positioning and fixing devices of various types for positioning such a work pallet and for fixing it to a base member have been widely supplied for practical use.

For example, in the object positioning and fixing device described in Patent Document #1, a reference seating surface for positioning in the vertical direction is formed on the upper surface of a base member, and first and second reference members for positioning in the horizontal direction are provided at locations in the vicinity of a pair of corner portions of the base member that are in a diagonal relationship. Each of the first and second reference members comprises a flange portion that is received in a fitting aperture in the base member and is fixed by a plurality of bolts, an engagement projection that projects upward from the central portion of this flange portion, a tapered engagement surface that is formed on the external peripheral surface of the engagement projection, and a bolt hole that is formed in the engagement projection.

Bolt insertion holes are formed in the work pallet at positions corresponding to the first and second reference members, and head portion reception apertures are formed at the upper portions of the bolt insertion holes for receiving bolt head portions. Annular engagement members that can be engaged in a tightly contacting state to the respective engagement projections of the first and second reference members are fixed in recessed fitting apertures that are provided in the bottom side portion of the work pallet.

The work pallet is mounted on the base member, and, in the state in which the lower surface of the work pallet is seated on the reference seating surface, the portions of the work pallet in the neighborhood of the pair of corner portions thereof are positioned and fixed in the vertical direction and in the horizontal direction on the base member by bolts being inserted through the pair of insertion holes from above and being screwingly engaged into the bolt holes of the first and second reference members.

Moreover, along with two bolt holes being formed in the other pair of corner portions of the base member that are in a diagonal relationship than the abovementioned pair of corner portions thereof, also a pair of bolt insertion holes corresponding to this pair of bolt holes are formed in the work pallet, and the portions of the work pallet in the vicinity of this other pair of corner portions thereof are fixed to the base member by screwingly inserting a pair of bolts that have been inserted through this pair of bolt insertion holes from above into the corresponding bolt holes.
Patent Document #1: JP Laid-Open Patent Publication 2011-251376

SUMMARY OF THE INVENTION

With the object positioning device described above, if due to manufacturing error some deviation in the vertical direction of the positions of the pair of engagement projections occurs with respect to the reference seating surface of the base member, then the anticipated function for positioning in the horizontal direction cannot be obtained. However since, when forming the fitting apertures for attaching the flange members of the first and second reference members, it may be difficult to keep the machining tolerance related to the depth of the fitting aperture to around 5 µm or less, accordingly it is not possible to set the height positions of the engagement projections of the first and second reference members, in other words the height positions of their tapered engagement surfaces, with respect to the reference seating surface of the base member with high accuracy. Due to this, there is the problem that it is difficult to ensure good positioning accuracy for positioning the work pallet in the horizontal direction with respect to the reference seating surface of the base member.

Since in this construction the flange portions are formed on the first and second reference members, and the flange portions are fixed in the fitting apertures by a plurality of bolts, accordingly there are also the problems that the fitting positions in which the first and second reference members are attached to the base member are limited, that the first and second reference members become large sized members having a complicated structure, that accordingly their cost of production (the cost of the material, the cost of machining, and the cost of fitting) becomes high, and so on.

The objective of the present invention is to provide an object positioning and fixing device that is capable of enhancing the accuracy of positioning in the horizontal direction, and also to be able to simplify and make more compact the construction of reference members, thus reducing the cost of production.

The present invention presents an object positioning and fixing device that positions and fixes a target object on a base member in the horizontal direction and in the vertical direction, characterized in that: the base member comprises a reference seating surface for positioning in the vertical direction, and the target object comprises a contacting surface that can contact against the reference seating surface; one of the base member and the target object comprises a fitting hole that is formed to open to the reference seating surface or to the contacting surface, and a reference member that is fixed in the fitting hole; the other of the base member and the target object comprises an installation hole that is formed to open to the contacting surface or to the reference seating surface at a position corresponding to the reference member, and an annular engagement member that is fixed in the installation hole; the reference member comprises a fitting cylindrical portion that is fitted into and fixed in the fitting hole, an engagement projection that is formed integrally with the fitting cylindrical portion so as to have a larger external diameter than the fitting cylindrical portion and that projects from the reference seating surface or the contacting surface toward the other, a tapered engagement surface that is formed on at least a portion of an external peripheral surface of the engagement projection and whose diameter becomes smaller towards the other, and a base end contacting surface that is formed on a base end of the fitting cylindrical portion side of the engagement projection and that contacts against the reference surface or the contacting surface; and the annular engagement member comprises a tapered contacting surface that, when the contacting surface is contacted against the reference seating surface, can engage in a tightly contacting state with the tapered engagement surface of the engagement projection, via elastic deformation of the annular engagement member or of the engagement projection. It should be understood that "bolt insertion hole" means a hole through which a bolt can be passed, while "bolt hole" means a threaded hole into which a bolt can be screwingly engaged.

The second feature of the present invention is characterized in that a plurality of the reference members are provided at mutually separated positions, and, respectively corresponding to the plurality of reference members, a plurality of the fitting holes, a plurality of the installation holes, and a plurality of the annular engagement members are provided.

The third feature of the present invention is characterized in that an annular clearance for promoting elastic deformation of the annular engagement member in the radially outward direction is defined at least at a portion between an external peripheral surface of the annular engagement member and an inner peripheral surface of the installation hole.

The fourth feature of the present invention is characterized in that an annular groove that opens toward the reference seating surface or toward the contacting surface is formed in the annular engagement member for promoting elastic deformation thereof in its radially outward direction.

The fifth feature of the present invention is characterized in that the reference member comprises a first bolt insertion hole, the target object comprises a second bolt insertion hole corresponding to the first bolt insertion hole, the base member comprises a first bolt hole corresponding to the first and second bolt insertion holes, and a first bolt is provided that is passed from above the target object through the first and second bolt insertion holes and is screwingly engaged in the first bolt hole.

The sixth feature of the present invention is characterized in that the target object comprises a third bolt insertion hole that is different from the second bolt insertion hole, the base member comprises a second bolt hole corresponding to the third bolt insertion hole, and a second bolt is provided that is passed from above the target object through the third bolt insertion hole and is screwingly engaged in the second bolt hole.

The seventh feature of the present invention is characterized in that head portion reception apertures that respectively contain head portions of the first and second bolts are formed in the upper portions of the second and third bolt insertion holes.

The eighth feature of the present invention is characterized in that the second bolt insertion hole is made as a bolt hole that is larger in diameter than the first bolt insertion hole, and that can allow the first bolt to pass through.

The ninth feature of the present invention is characterized in that a stop ring groove is formed in the first bolt insertion hole.

The tenth feature of the present invention is characterized in that a concave circular depression that communicates with the installation hole is formed at an interior portion of the installation hole, and a stop ring groove is formed around the inner periphery of the annular engagement member.

According to the present invention, when the target object is to be positioned and fixed on the base member, the target object is set on the base member, the annular engagement member of the target object is respectively engaged to the engagement projection of the reference member on the base member side, and, when the target object is pressed towards the base member, for example by bolts for clamping, via elastic deformation of the annular engagement member, the tapered engagement surface of the annular engagement member is engaged in a tightly contacting state to the corresponding tapered engagement surface of the engagement projection of the reference member, so that the target object is positioned with good accuracy in the horizontal direction; and, moreover, the contacting surface of the target object is contacted against the reference seating surface of the base member, so that the target object is positioned with good accuracy in the vertical direction.

Since the base end contacting surface of the engagement projection is made to contact against the reference seating surface or against the contacting surface, and since it is thus possible to enhance the accuracy of the position in the vertical direction of the engagement projection with respect to the reference seating surface or the contacting surface, accordingly it is possible to enhance the positioning accuracy for positioning the target object in the horizontal direction with respect to the base member. Moreover, since in this structure the fitting cylindrical portion of the reference member is fitted into and fixed in the fitting hole, and the fitting cylindrical portion has an external diameter which is smaller than that of the engagement projection, accordingly it is possible to simplify the structure of the reference member and to make it more compact, and it is possible greatly to reduce the cost of production (the cost of material, the cost of machining, and the cost of fitting).

Since, according to the second feature of the present invention, a plurality of the reference members are provided at mutually separated positions, and, respectively corresponding to this plurality of reference members, a plurality of the fitting holes, a plurality of the installation holes, and a plurality of the annular engagement members are provided, accordingly it is possible to position the target object in the horizontal direction and moreover to regulate it so that it does not rotate within the horizontal plane.

According to the third feature of the present invention, it is possible to promote elastic deformation of the annular engagement member via the annular clearance having a simple structure, defined between the annular engagement member and the inner peripheral surface of the installation hole.

According to the fourth feature of the present invention, it is possible to promote elastic deformation of the annular engagement member via the annular groove that is formed in the annular engagement member.

According to the fifth feature of the present invention, since in this structure the first bolt that is passed through the first bolt insertion hole formed in the reference member and through the second bolt insertion hole formed in the target object is screwingly engaged in the first bolt hole formed in the base member, and since thus the bolt engagement force does not directly operate on the reference member, accordingly there is no danger that the fitting cylindrical portion of the reference member will shift with respect to the fitting hole, and this is beneficial for ensuring accuracy of positioning in the horizontal direction by the reference member.

According to the sixth feature of the present invention, it is possible to strengthen the fixing force that fixes the target object to the base member by passing the second bolt through the third bolt insertion hole of the target object and screwingly engaging it into the second bolt hole of the base member.

According to the seventh feature of the present invention, since the head portion reception apertures that respectively contain the head portions are formed in the upper portions of the second and third bolt insertion holes, accordingly this is advantageous from the point of view of using the upper surface of the target object, since the bolt head portions do not project on the upper surface of the target object.

According to the eighth feature of the present invention, since the second bolt insertion hole is made as a bolt hole that is larger in diameter than the first bolt insertion hole, and that can allow the first bolt to pass through, accordingly, when the target object is to be separated from the base member, a bolt for removal is screwingly engaged in the bolt hole constituted by the second bolt insertion hole, so that it is possible to exert reaction force at the end of the engagement projection and thus to break the taper engagement between the annular engagement member and the engagement projection.

According to the ninth feature of the present invention, since the stop ring groove is formed in the first bolt insertion hole, accordingly, when the reference member is to be exchanged, it is possible to remove the reference member by utilizing a stop ring installed in the stop ring groove.

According to the tenth feature of the present invention, since the concave circular depression that communicates with the installation hole is formed at the bottom of the installation hole, and the stop ring groove is formed around the inner periphery of the annular engagement member, accordingly, when the annular engagement member is to be exchanged, it is possible to remove the annular engagement member via a circular plate that is installed in the concave circular depression, and a stop ring that is installed in the stop ring groove.

DETAILED DESCRIPTION OF THE PREFERRED EMBODIMENTS

In the following, implementations of the present invention will be explained on the basis of several embodiments thereof.

It should be understood that, in the following embodiments, positioning in the horizontal direction means determination of the position in the horizontal direction, while positioning in the vertical direction means determination of the position in the vertical direction.

Embodiment 1

Figure 1:
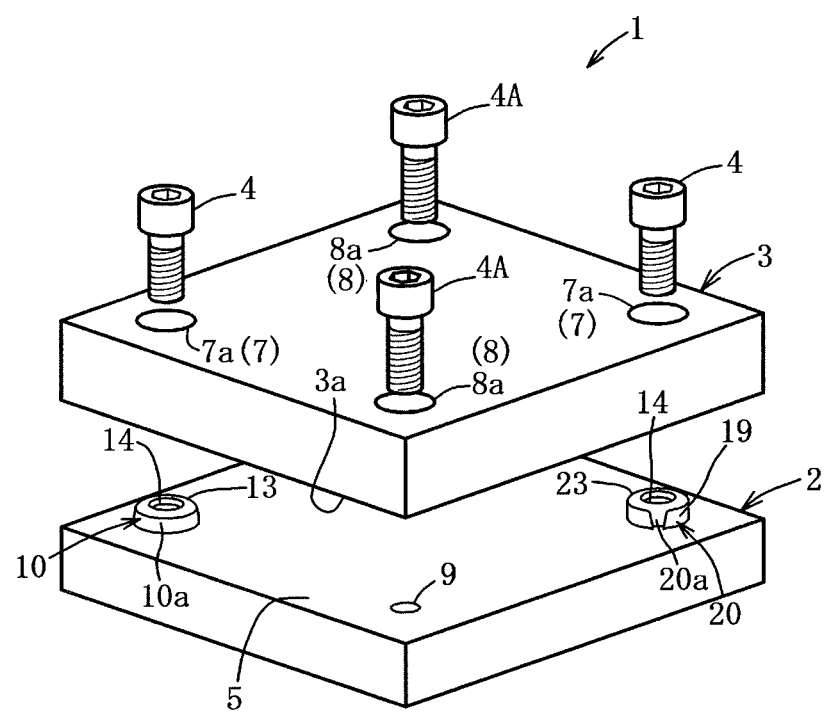
FIG. 1 is a break down perspective view of a pallet positioning and fixing device according to a first embodiment.
Figure 2:
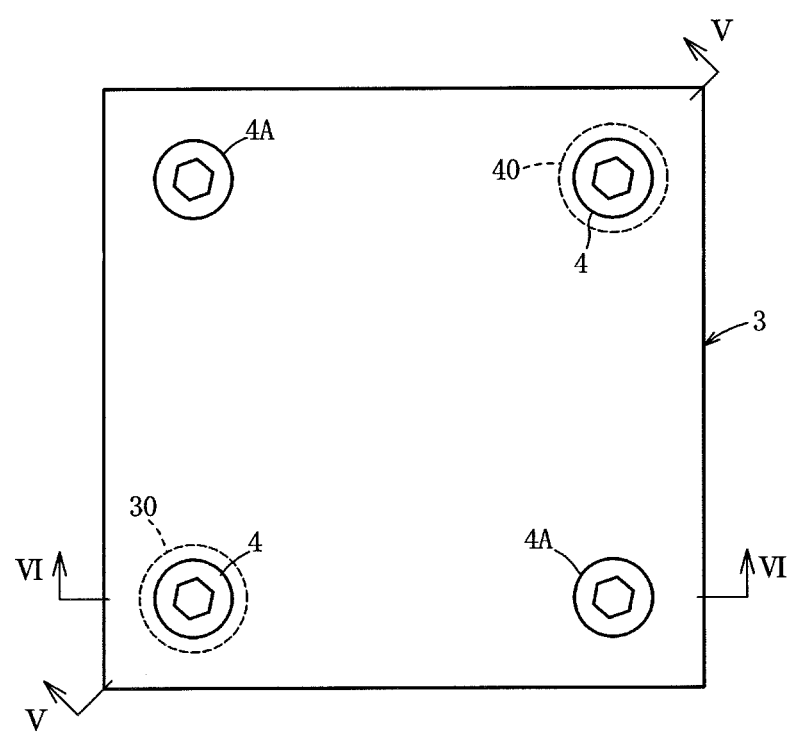
FIG. 2 is a plan view of the pallet positioning and fixing device.
Figure 3:
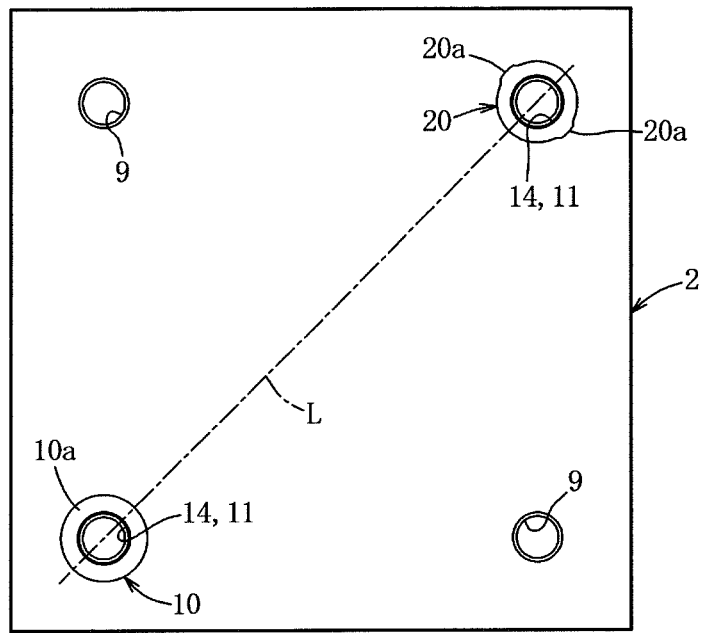
FIG. 3 is a plan view of a base member.
Figure 4:
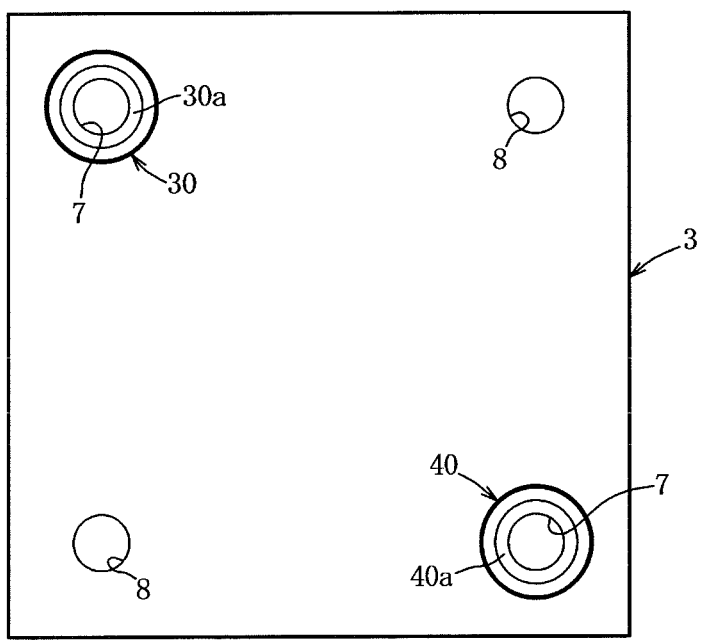
FIG. 4 is a view of the bottom surface of a work pallet.
Figure 5:
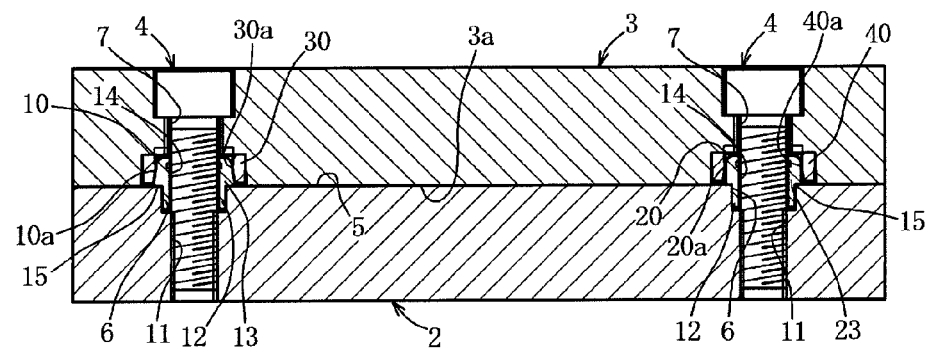
FIG. 5 is a sectional view taken along lines V-V of FIG. 2.
Figure 6:
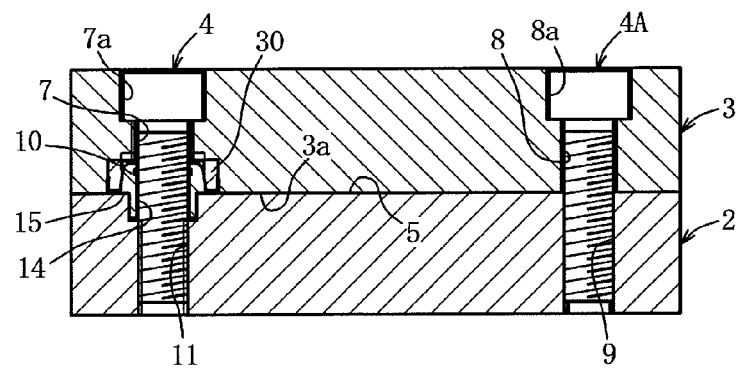
FIG. 6 is a sectional view taken along lines VI-VI of FIG. 2.

As shown in FIG. 1, the pallet positioning and fixing device 1 of the first embodiment (this corresponds to the "object positioning and fixing device", and hereinafter will be referred to as the "object positioning and fixing device") is a device that fixes the position of a work pallet 3 (the pallet corresponds to the "target object" which is positioned and fixed), which is for supporting a workpiece that is to be supplied for mechaning processing, on a base member 2 in the horizontal direction and in the vertical direction, and fixes the work pallet with four fixing bolts 4, 4A.

The base member 2 is set up by, for example, being fixed to a table of a machine tool or the like. One or a plurality of workpieces (not shown in the figure) are fixed on the work pallet 3 by clamp devices or bolts not shown in the figure, and, after this work pallet 3 has been conveyed on to the base member 2 and has been positioned and fixed in the horizontal direction and in the vertical direction, machining processing is performed on the one or a plurality of workpieces on the work pallet 3.

This positioning and fixing device 1 comprises the base member 2, the work pallet 3, and the four bolts for clamping 4, 4A. The base member 2 and the work pallet 3 are both made from steel, and are square or rectangular thick flat plate members. Almost the entire area of the upper surface of the base member 2 is formed as a horizontal reference seating surface 5 for mounting the work pallet 3 and for seating the lower surface of the work pallet 3, so that the work pallet 3 is positioned in the vertical direction. And almost the entire area of the bottom surface of the work pallet 3 is formed as a horizontal contacting surface 3a that is capable of contacting against the reference seating surface 5 in a surface contacting state.

As shown in FIGS. 1 through 7, the base member 2 comprises the reference seating surface 5, a pair of fitting holes 6 oriented in the vertical direction that are formed at locations near a pair of corner portions of the base member 2 that are in a diagonal relationship, first and second reference members 10, 20 for positioning in the horizontal direction that are respectively fixed in these fitting holes 6, a pair of bolt holes 11 oriented in the vertical direction that are formed concentrically in the lower sides of the first and second reference members 10, 20, and a pair of bolt holes 9 oriented in the vertical direction that are formed at locations near the other pair of corner portions of the base member 2 that are in a diagonal relationship (i.e. near the pair of corner portions other than the above described pair of corner portions). It should be understood that, in this specification, "bolt insertion hole" means a hole through which a bolt can be passed, while "bolt hole" means a threaded hole into which a bolt can be screwingly engaged.

The pair of fitting holes 6 are formed so as to open to the reference seating surface 5 of the base member 2 at positions that are mutually spaced apart from one another. Accordingly, the first and second reference members 10, 20 are positioned so as to be mutually spaced apart. The second reference member 20 is a device for rotational regulation (i.e. for positioning in the horizontal direction) within a horizontal plane that is centered on the first reference member 10.

As shown in FIGS. 1 through 9, the first reference member 10 comprises a fitting cylindrical portion 12 that is fitted into and fixed in the fitting hole 6 by being pressed thereinto, an engagement projection 13 which is formed integrally with the fitting cylindrical portion 12 so as to be concentric therewith and which projects upwards from the top end of the fitting cylindrical portion 12 (towards the work pallet) while having a larger diameter than that of the fitting cylindrical portion 12, a bolt insertion hole 14 that is formed in the central portion of the first reference member 10 so as to be oriented in the vertical direction, and a stop ring groove 10b that is formed around the upper portion of the internal periphery of the bolt insertion hole 14. It should be understood that the first reference member 10 could also be fixed in the fitting hole 6 by some fixing means other than by being pressed thereinto.

A tapered engagement surface 10a is formed on the external periphery of the engagement projection 13 of the first reference member 10, with its diameter becoming smaller upwards (i.e. towards the work pallet 3). The vertical cross section of the external peripheral portion of the upper end of the engagement portion 13 is formed in the shape of a circular arc. An annular base end contacting surface 15 that is contacted against the reference seating surface 5 is formed on the base end of the engagement projection 13 facing towards the fitting cylindrical portion 12. It should be understood that a small annular clearance 16 is left between the bottom surface of the fitting hole 6 and the lower end surface of the fitting cylindrical portion 12. However, the tapered engagement surface 10a could also consist of a plurality of tapered engagement surfaces that are formed intermittently around the circumferential direction.

The bolt hole 11, which is oriented in the vertical direction, is formed in the base member 2 so as to correspond concentrically to the bolt insertion hole 14 of the first reference member 10. And a bolt insertion hole 7 is formed at a location on the work pallet 3 corresponding to the first reference member 10, so as to correspond concentrically to the bolt insertion hole 14, and a head portion reception aperture 7a that receives the head portion of the bolt 4 is formed at the upper portion of this bolt insertion hole 7.

As will be described hereinafter, the work pallet 3 is fixed to the base member 2 by screwingly engaging the bolt 4 that is inserted through the bolt insertion hole 7 and through the bolt insertion hole 14 into the bolt hole 11. The abovementioned bolt insertion hole 7 is a bolt hole that is larger in diameter than the bolt insertion hole 14, and is formed as a bolt hole through which the bolt 4 can be passed (refer to FIG. 14).

As shown in FIGS. 1 through 11, the structure of the second reference member 20 is the same as that of the first reference member 10, apart from tapered engagement surfaces 20a of an engagement projection 23, and accordingly only the tapered engagement surfaces 20a formed on the engagement projection 23 will be explained.

The two tapered reference surfaces 20a, whose diameters reduce upward (i.e. towards the work pallet 3), are formed on the external periphery of the engagement projection 23 of the second reference member 20, at positions that divide its circumference into two equal parts. A pair of shallow recessed portions 19 that are shaped in plan view as circular arcs are formed on the outer surface portion of the second reference member 20 between the two tapered engagement surfaces 20a, and this structure ensures that a second annular engagement member 40 that will be described hereinafter does not contact the wall surfaces of these shallow recessed portions 19. The vertical cross sections of the external peripheral portions of the upper ends of the tapered engagement surfaces 20a are formed in the shape of circular arcs.

As seen in plan view, two tapered engagement surfaces 20a oppose one another along a direction that is orthogonal to the center line L (refer to FIG. 3) that connects the axes of the first and second reference members 10, 20. The lengths in the circumferential direction of the tapered engagement surfaces 20a are around $\frac{1}{8}$ to $\frac{1}{12}$ of the circumference, and accordingly, when the second annular engagement member 40 is elastically deformed in the radially outward direction, its amount of elastic deformation is increased, so that adhesion between the tapered engagement surfaces 20a and the second annular engagement portion 40 can be enhanced.

A bolt insertion hole 14, a bolt insertion hole 7, and a bolt hole 11 are provided in the second reference member 20, in a similar manner to the bolt insertion hole 14, the bolt insertion hole 7, and the bolt hole 11 corresponding to the first reference member 10.

As shown in FIGS. 1, 4, 5, and 6, the work pallet 3 comprises a first annular engagement member 30 that can engage with the first reference member 10, a second annular engagement member 40 that can engage with the second reference member 20, two bolt insertion holes 7 that correspond to the bolt insertion holes of the first and second reference members 10, 20, and two bolt insertion holes 8 that correspond to the two bolt holes 9 in the base member 2.

The first and second annular engagement members 30, 40 are fitted into and fixed in circular installation holes 17 that are formed in the work pallet 3 so as to open to the contacting surface 3a of the work pallet 3, by being pressed thereinto.

The bolt insertion holes 7 pierce through the work pallet 3 in its thickness direction, and are formed so as to be parallel to the axes of the first and second reference members 10, 20 and moreover as to be concentric therewith.

Head portion reception apertures 8a are formed in the upper portions of the bolt insertion holes 8, and are capable of receiving the head portions of the bolts 4A. Since the upper surfaces of the head portions of the bolts 4, 4A are set at positions that are very slightly lower than the upper surface of the pallet 3, accordingly this is beneficial for placing a workpiece on the upper surface of the pallet 3. It should be understood that the first and second annular engagement members 30, 40 have the same structure. Moreover, it would also be acceptable to arrange for the first and second annular engagement members 30, 40 to be fixed in the installation holes 17 by some fixing means other than by being pressed thereinto.

The first annular engagement member 30 is built so as to be capable of being elastically deformed in the radially outward direction when it is fitted over the engagement projection 13 of the first reference member 10 and moreover the engagement force of its bolt 4 operates, and also is built so as to be capable of engaging tightly against the tapered engagement surface 10a of the engagement projection 13.

For this, the lower half portion of the inner peripheral surface of the first annular engagement member 30 is formed as a tapered contacting surface 30a that can engage tightly against the tapered engagement surface 10a, the external diameter of the lower half portion of the first annular engagement member 30 is formed to be slightly smaller than the external diameter of the upper half portion, and an annular clearance 18 for promoting elastic deformation of the first annular engagement member 30 in the radially outward direction is formed between the external peripheral surface of the lower half portion of the first annular engagement member 30 and the inner peripheral surface of the installation hole 17. The thickness of the first annular engagement member 30 in the radial direction should be a thickness that gives it the rigidity required for positioning in the horizontal direction.

It should be understood that the height dimension of the first annular engagement member 30 is set to be somewhat shorter than the depth dimension of the installation hole 17, so that the lower end of the first annular engagement member 30 does not project below the contacting surface 3a, while the upper end of the first annular engagement member 30 is contacted against the upper end wall surface of the installation hole 17. Furthermore, a stop ring groove 30d is formed at the upper end portion of the internal periphery of the first annular engagement member 30, and a circular concave depression 17a is formed at the inner end of the installation hole 17, communicating with the installation hole 17 and moreover having a diameter that is smaller than the internal diameter of the first annular engagement member 30 (refer to FIGS. 16 and 17).

The second annular engagement member 40 is built so as to be capable of being elastically deformed in the radially outward direction when it is fitted over the engagement projection 23 of the second reference member 20 and moreover the engagement force of its bolt 4 acts, and also is built so as to be capable of engaging tightly against the tapered engagement surface 20a of the engagement projection 23.

The second annular engagement member 40 is a member having the same structure as that of the first annular engagement member 30, and a tapered contacting surface 40a that is capable of engaging tightly against the tapered engagement surface 20a and a stop ring groove 40d are formed on the second annular engagement member 40, in a similar manner to the first annular engagement member 30. A circular concave depression 17a that corresponds to the stop ring groove 40d is also formed in the work pallet 3.

It should be understood that a first positioning and fixing mechanism that performs positioning and fixing in the horizontal direction is constituted by the first reference member 10, the first annular engagement member 30, and their bolt 4 and so on, while a second positioning and fixing mechanism that also performs positioning and fixing in the horizontal direction is constituted by the second reference member 20, the second annular engagement member 40, and their bolt 4 and so on.

Next, the operation of the positioning and fixing device 1 described above will be explained.

The base member 2 is set up in advance on a table of a machine tool or the like, and is fixed thereto. In a state in which one or a plurality of workpieces have been attached to the work pallet 3 during a work preparation stage, the work pallet 3 is conveyed onto the base member 2, and is mounted on the upper surface of the base member 2 against its reference seating surface 5.

At this time, the first and second annular engagement members 30, 40 on the work pallet 3 side are lightly engaged with the engagement projections 13, 23 of the first and second reference members 10, 20. In this state, by inserting both of the two bolts 4 through the bolt insertion holes 7, and by screwingly engaging both of them into the corresponding bolt holes 11 in the state in which they are passed through the bolt insertion holes 14 of the engagement projections 13, 23 of the first and second reference members 10, 20, the first and second annular engagement members 30, 40 are elastically deformed in their radially outward directions, and their tapered contacting surfaces 30a, 40a are engaged with and fixed to the tapered engagement surfaces 10a, 20a in a tightly contacted state. Next, the portions of the work pallet 3 in the vicinity of its pair of corner portions are fixed to the base member 2 by inserting both of the two bolts 4A through the bolt insertion holes 8, and by screwingly engaging both of them into the bolt holes 9 of the base member 2. Due to this, the contacting surface 3a of the work pallet 3 is put into the state of being closely contacted to the reference seating surface 5.

The tapered contacting surface 30a of the first annular engagement member 30 is positioned in the horizontal direction so as closely to contact the tapered engagement surface 10a of the engagement projection 13 of the first reference member 10, and the tapered contacting surface 40a of the second annular engagement member 40, by being closely contacted against the tapered engagement surface 20a of the engagement projection 23, performs regulation and positioning the work pallet 3 in the horizontal direction, so as to prevent rotation in the horizontal plane around the axis of the first reference member 10 as a center. In this manner, it is possible to position and fix the work pallet 3 with respect to the base member 2 in the horizontal direction and in the vertical direction.

Figure 14:
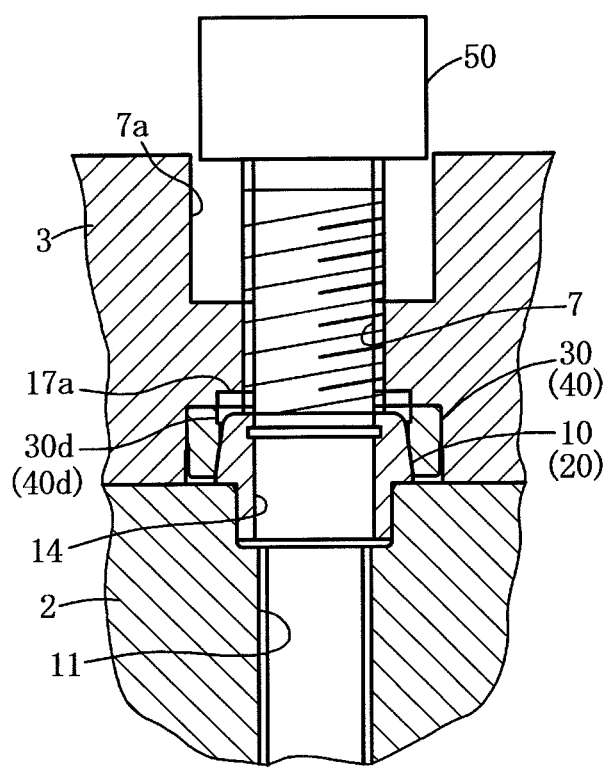
FIG. 14 is a sectional view of essential portions, showing a method for breaking engagement between an engagement portion and the annular engagement member.

In order to remove the work pallet 3 that has been fixed as described above, first, when releasing the engagement of the first and second reference members 10, 20 and the first and second annular engagement members 30, 40, as shown in FIG. 14, bolts 50 for engagement release are screwingly engaged into the bolt insertion holes 7 (the bolt holes), and, in the state in which the ends of these bolts 50 are contacted against the head portions of the first and second reference members 10, 20, it is possible to release the engagement described above by rotating the bolts 50 in the direction to tighten them up further, so that reaction force is generated.

Figure 15:
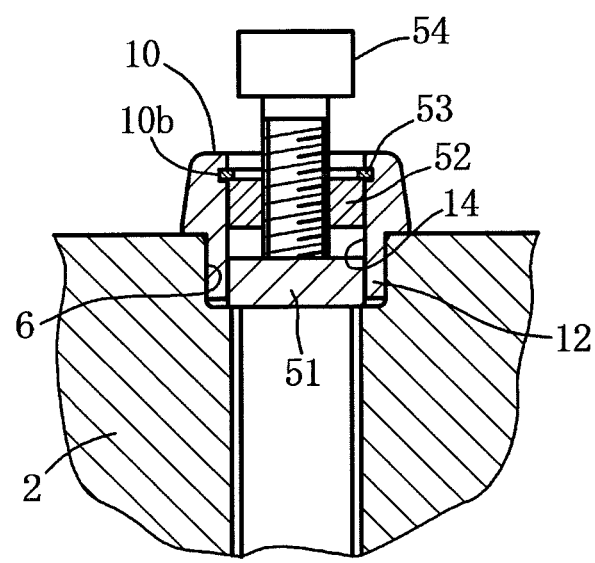
FIG. 15 is a sectional view of essential portions, showing a method for taking off the reference member from the base member.

Next, when one of the first and second reference members 10, 20 is to be exchanged, as shown in FIG. 15; a circular stop plate 51 is inserted into the bolt insertion hole 14, and is received on and stopped by the bottom surface of the fitting hole 6; next, a circular nut 52 is received in the bolt insertion hole 14 so that it can move up and down; next, a stop ring 53 is installed in the stop ring groove 10b; next, a bolt for removal 54 is screwingly engaged into the circular nut 52; and finally, in the state in which the end of the bolt 54 is contacted against the circular stop plate 51, it is possible to pull out the fitting cylindrical portion 12 of the first or second reference member 10, 20 from its fitting hole 6 and to take off the first or second reference member 10, 20 by rotating the bolt 54 in the direction to tighten it up further, so that reaction force is generated.

Figure 16:
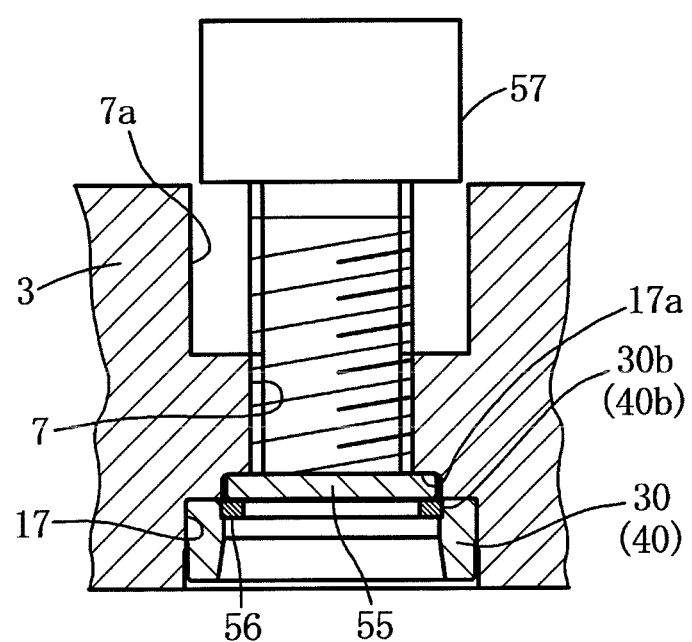
FIG. 16 is a sectional view of essential portions, showing a method for taking off the annular engagement member from the work pallet.

Next, when one of the first or second annular engagement members 30, 40 that are installed to the work pallet 3 is to be exchanged, as shown in FIG. 16, after having inserted a circular stop plate 55 into the circular concave depression 17a, a stop ring 56 is installed into the stop ring groove 30d, 40d, and next a bolt for removal 57 is screwingly engaged into the bolt insertion hole 7 (the bolt hole), so that it is possible to take out the first or second annular engagement member 30, 40 from its installation hole 14 by pressing the circular stop plate 55 and the stop ring 56 downward.

Figure 17:
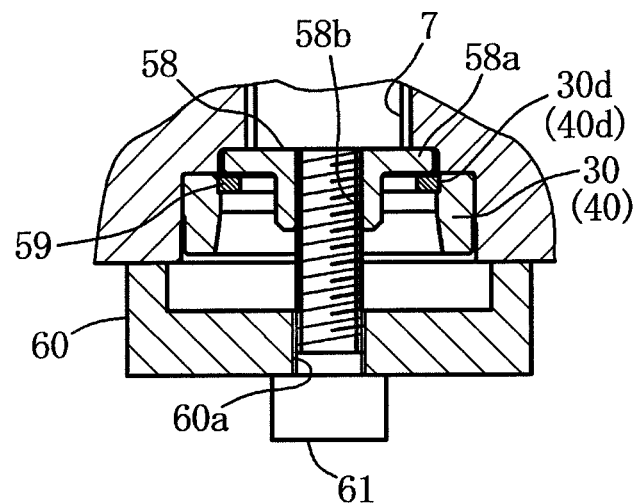
FIG. 17 is a sectional view of essential portions, showing another method for taking off the annular engagement member from the work pallet.

Instead of the removal method shown in FIG. 16, a removal method shown in FIG. 17 could be employed. After having inserted a circular stop plate 58a of a nut member 58 with circular stop plate attached into the circular concave depression 17a, a stop ring 59 is installed into the stop ring groove 30d, 40d, and then, by rotating a bolt for removal 61 that has been inserted through a bolt insertion hole 6a of a gap creation member 60 and that has been screwingly engaged into a bolt hole 58b of the nut member 58 with circular stop plate attached, it is possible to take out the first or second annular engagement member 30, 40 from its installation hole 14 by pulling the nut member 58 with circular stop plate attached downward.

Next, the advantageous effects provided by the positioning and fixing device 1 described above will be explained.

With this structure in which the first and second reference members 10 and 20 are fixed to the base member 2 by fitting the fitting cylindrical portions 12 of the first and second reference members 10, 20 into the fitting holes 6 of the base member 2, it is possible very greatly to simplify the first and second reference members 10, 20 and to make them more compact, and also to reduce their cost of production (the cost of material, the cost of processing, and the cost of assembly), since the fitting cylindrical portions 12 have smaller external diameters than the engagement projections 13, 23. Moreover, the freedom when arranging the first and second reference members 10, 20 in the base member 2 becomes greater.

Since, in this structure for the first and second reference members 10, 20, the base end contacting surfaces 15 are formed on the lower ends of the engagement projections 13, 23 and contact against the reference seating surface 5, accordingly it is possible to set the positions in the height direction of the engagement projections 13, 23 with respect to the reference seating surface 5 with good accuracy. Due to this, it is possible to enhance the positioning accuracy for positioning the work pallet 3 in the horizontal direction. Moreover, via the annular clearances 18 having a simple structure that are defined between the first and second annular engagement members 30, 40 and the inner peripheral surfaces of the installation holes 17, it is possible to promote elastic deformation of the first and second annular engagement members 30, 40.

Since the bolts 4 that are inserted through the bolt insertion holes 14 formed in the first and second reference members 10, 20 and the bolt insertion holes 7 formed in the work pallet 3 are screwingly engaged in the bolt holes 11 that are formed in the base member 2, and since thus the engagement forces of the bolts do not operate directly on the first and second reference members 10, 20, accordingly this is advantageous from the point of view of enhancing the accuracy of positioning in the horizontal direction by the first and second reference members 10, 20, since there is no danger of the fitting cylindrical portions 12 of the first and second reference members 10, 20 shifting with respect to the fitting holes 6.

By inserting the two bolts 4A through the two bolt insertion holes 8 of the work pallet 3, and by screwingly engaging each of them into the respective one of the bolt holes 9 of the base member 2, it is possible to enhance the fixing force by which the work pallet 3 is fixed to the base member 2.

Since the head portion reception apertures 7a, 8a that receive the head portions of the bolts are formed in the upper portions of the bolt insertion holes 7, 8, accordingly this is advantageous from the point of view of setting up the workpiece on the upper surface of the work pallet 3, since the bolt head portions do not project above the upper surface of the work pallet 3.

Moreover even if, due to manufacturing errors on the side of the work pallet 3 with respect to the base member 2, there is some minute difference between the distance between the axes of the first and second annular engagement members 30, 40 and the distance between the axes of the first and second reference members 10, 20, it is still possible to position and fix the work pallet 3, since a slight positional deviation in the direction of the center line L of the second annular engagement member 40 is permitted.

With this pallet positioning and fixing device 1 it is possible greatly to reduce the cost of manufacture, since the mechanism for clamping has a simple structure, and there is no requirement to provide any hydraulic pressure cylinder for clamping or the like, because this construction fixes the work pallet 3 with the forces of engagement of the four bolts 4, 4A.

Since the entire area of the upper surface of the base member 2 is formed as the reference seating surface 5, so that there is no gap between the upper surface of the base member 2 and the contacting surface 3a of the work pallet 3, accordingly there is no danger that the work pallet 3 will be elastically deformed in the vertical direction, and swarf or the like does not intrude between the base member 2 and the work pallet 3. Moreover, since the reference seating surface 5 is formed by seating the contacting surface of the work pallet 3 on the upper surface of the base member 2, accordingly it is possible to form the reference seating surface 5 by making use of the base member 2.

Next, examples in which the first and second annular engagement members 30, 40 are partially altered will be explained.

(1) In order to promote elastic deformation of the first and second annular engagement members 30, 40 in their radially outward directions, a divided section may be formed by dividing each of the first and second annular members 30, 40 at a single spot around its circumferential direction; or, alternatively, divided sections may be formed by partially dividing each of the first and second annular members 30, 40 into sections at a plurality of spots around its circumferential direction.

Figure 13:
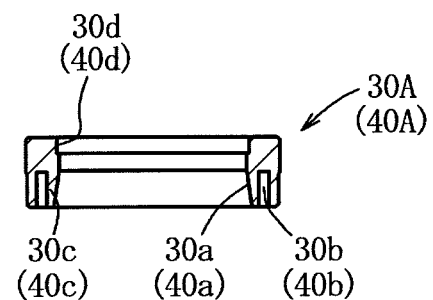
FIG. 13 is a sectional view of an annular engagement member according to a variant embodiment.

(2) As shown in FIG. 13, in order to promote elastic deformation of the first and second annular engagement members 30, 40 in their radially outward directions, deep groove-shaped annular grooves 30*b*, 40*b* that open towards the base member 2 may be formed in, for example, the lower halves of the first and second annular engagement members 30, 40; and thereby annular engagement wall portions 30*c*, 40*c* that can be elastically deformed in their radially outward directions are formed at the portions of the first and second annular engagement members 30, 40 that are more radially inward than the annular grooves 30*b*, 40*b*.

Figure 28:
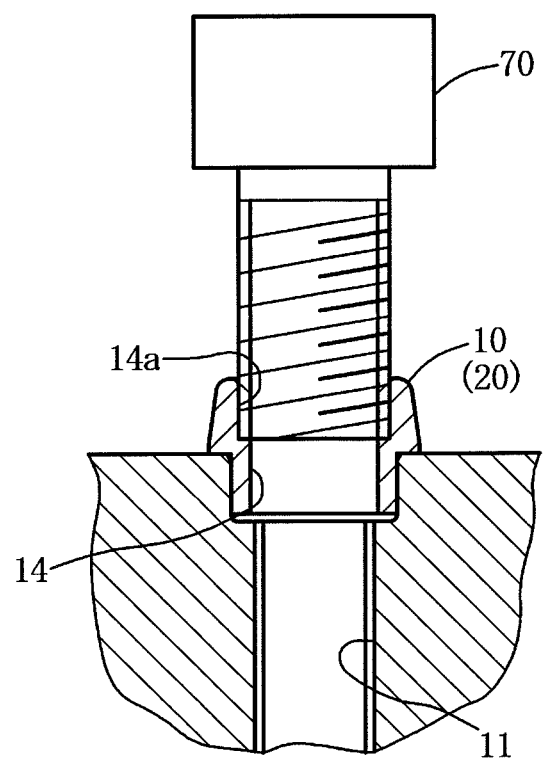
FIG. 28 is a sectional view of a base member, an annular engagement member, and a bolt that is screwingly engaged to the annular engagement member, according to a variant embodiment.

(3) It would also be acceptable to provide a structure in which, when the bolts 4 are engaged to the first and second reference members 10, 20 to the first and second annular engagement members 30, 40, it is arranged for the first and second reference members 10, 20 to be elastically deformed in their radially inward directions. In this case, it would be acceptable to make both the first and second annular engagement members 30, 40 and the first and second reference members 10, 20 to be capable of elastic deformation; or, alternatively, it would also be acceptable to make only the first and second reference members 10, 20 to be capable of elastic deformation. For example, a structure has been adopted for the first and second reference members 10, 20 that are shown in FIG. 28 and described hereinafter, with which they can easily be elastically deformed in the radially inward direction as described above.

(4) The stop ring grooves 10*b*, 30*d*, and 40*d* and the circular concave depression 17*a* may be omitted, since they are not essential features. Furthermore, the bolt insertion holes 7 may be formed as simple bolt insertion holes, and not as bolt holes. In this case, a plurality of bolts for releasing the engagement of the first and second reference members 10, 20 and the first and second annular engagement members 30, 40 could be fitted in bolt holes (not shown in the drawings) of the work pallet 3. Moreover, instead of those bolts, it would also be acceptable to install a plurality of hydraulic pressure cylinders to the base member 2, for removing the work pallet 3.

Embodiment 2

Figure 18:
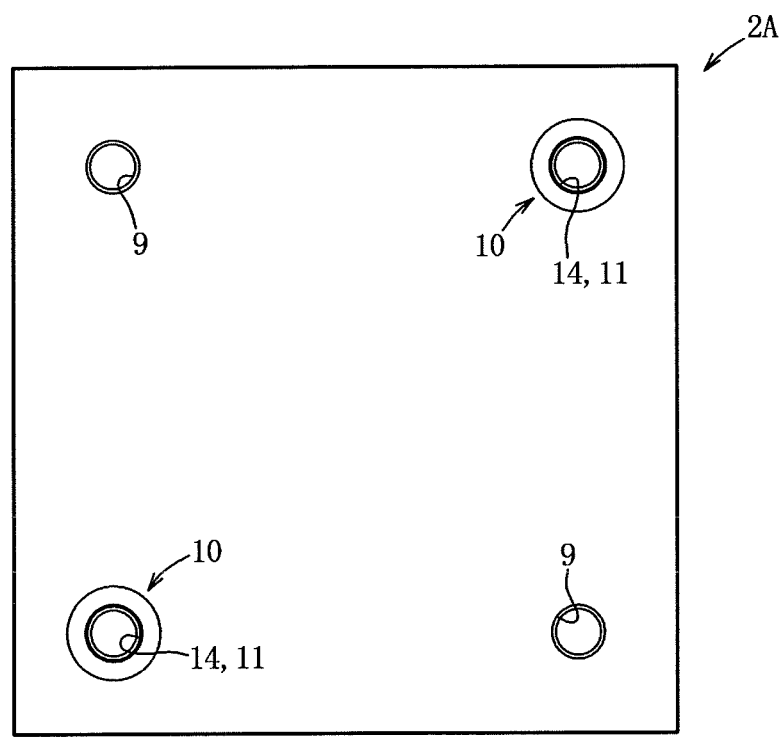
FIG. 18 is a plan view of a base member according to a second embodiment.

As shown in FIG. 18, in this positioning and fixing device, another first reference member 10 is provided to the base member 2A, instead of the second reference member 20. The other structures are the same as in the first embodiment, and accordingly similar reference symbols are appended to them as in the case of the first embodiment, and further explanation is omitted.

Embodiment 3

Figure 19:
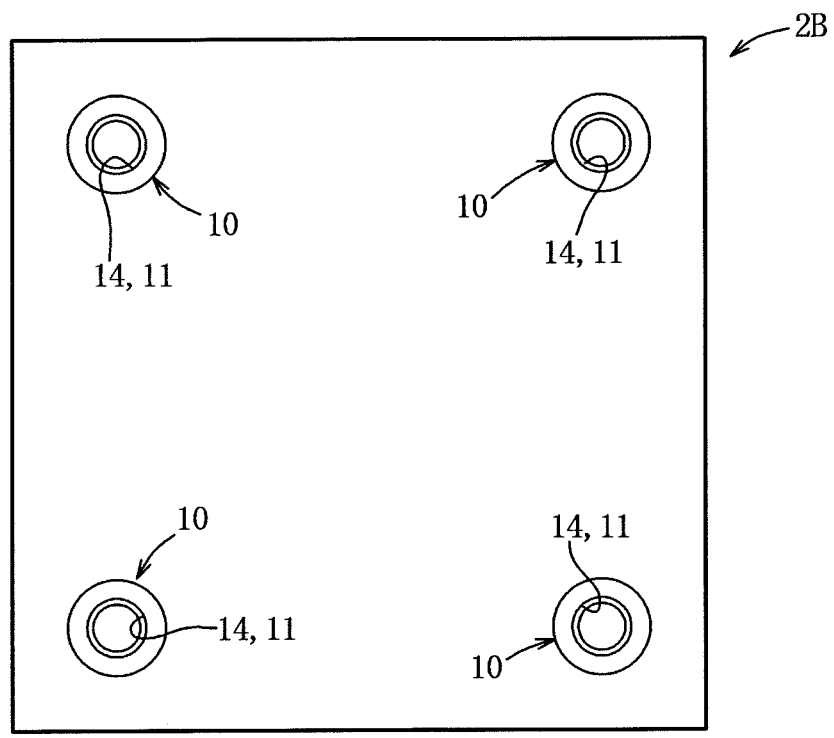
FIG. 19 is a plan view of a base member according to a third embodiment.
Figure 20:
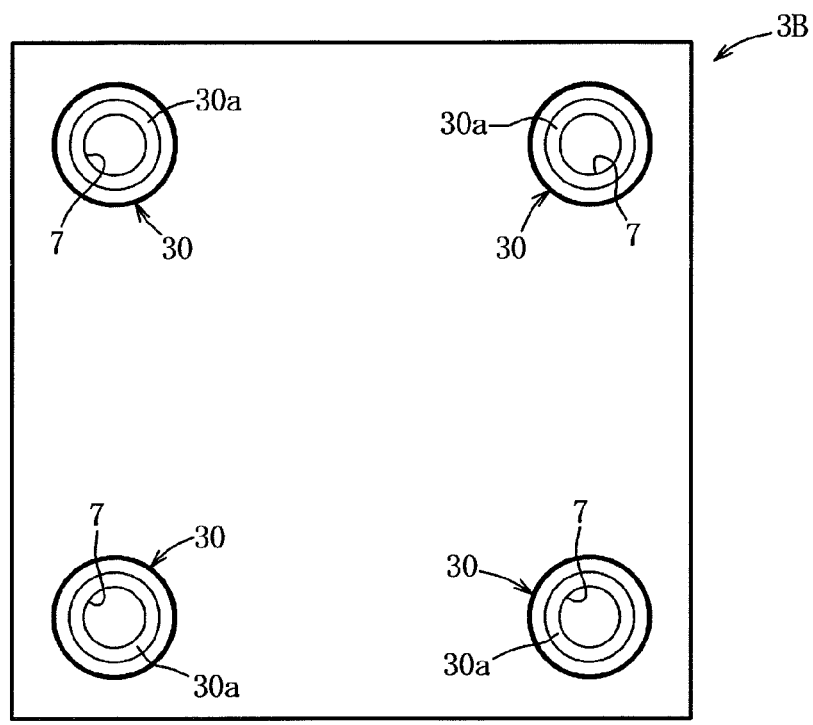
FIG. 20 is a view of the bottom surface of a work pallet according to the third embodiment.

As shown in FIGS. 19 and 20, in this positioning and fixing device, along with four first reference members 10 being provided at sites in the vicinity of each of the four corner portions of the base member 2B, also four first annular engagement members 30 that are capable of engaging with these four first reference members 30 are provided to the work pallet 3B. It should be understood that, in the base member 2B, the bolt holes 11 are formed in the portions below the first reference members 10. The other structures are the same as in the first embodiment, and accordingly similar reference symbols are appended to them as in the case of the first embodiment, and further explanation is omitted. With this positioning and fixing device, it is possible to enhance the accuracy with which the entire work pallet 3B is positioned in the vertical direction and in the horizontal direction by yet a further level, since it is possible to enhance the accuracy of positioning the four portions of the work pallet 3B in the vicinity of its corners, both in the vertical direction and in the horizontal direction.

Embodiment 4

Figure 21:
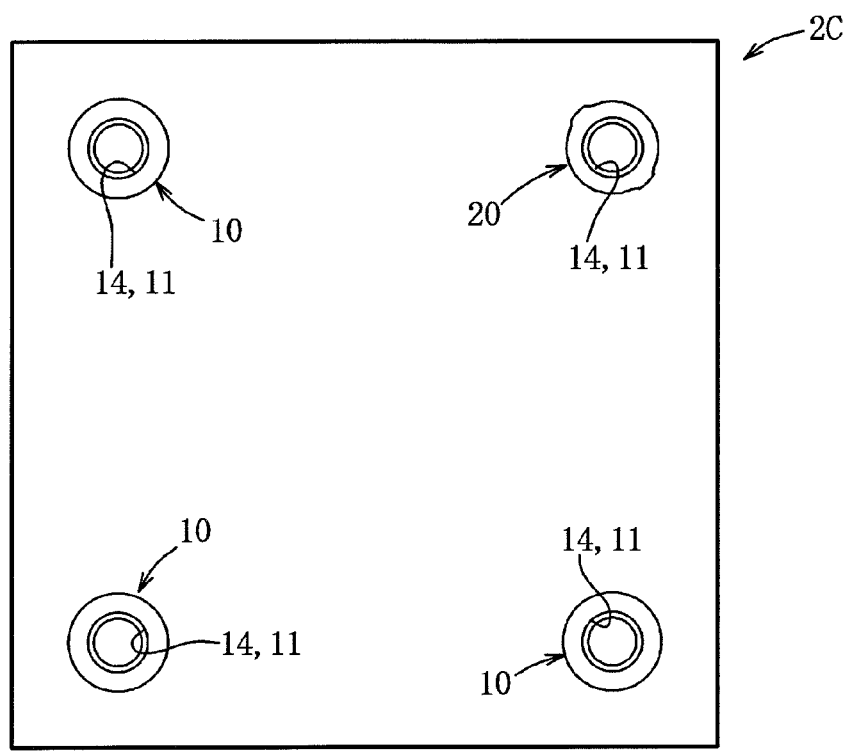
FIG. 21 is a plan view of a base member according to a fourth embodiment.
Figure 22:
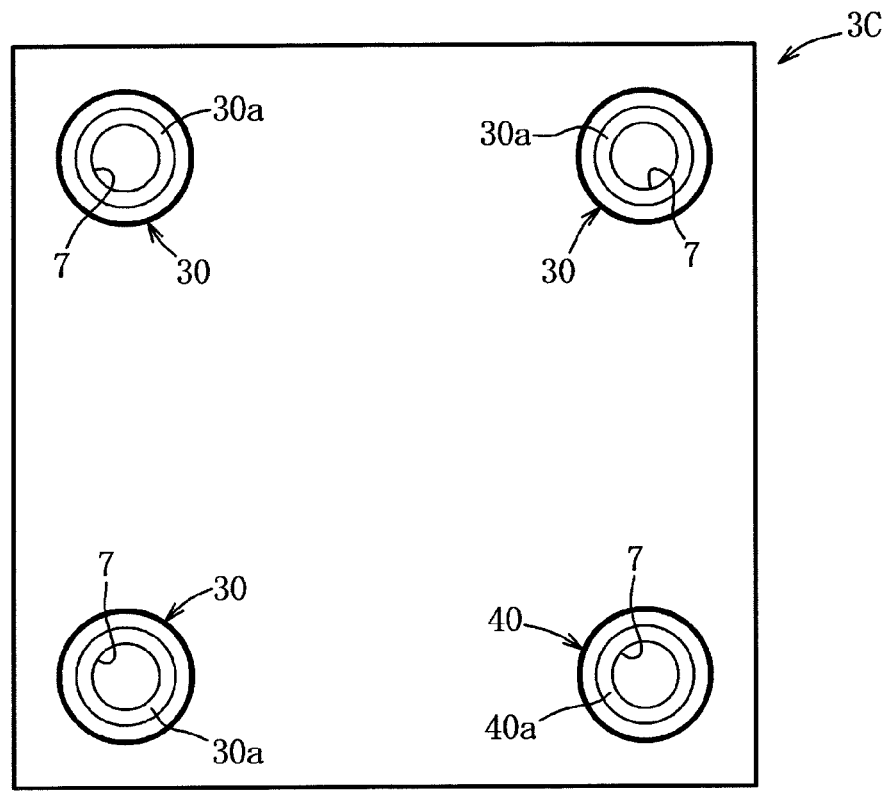
FIG. 22 is a view of the bottom surface of a work pallet according to the fourth embodiment.

As shown in FIGS. 21 and 22, in this positioning and fixing device, in a similar manner to the case for the base member 2 of the first embodiment, along with providing the first and second reference members 10, 20 to the base member 2C, a further pair of first reference members 10 are provided instead of the abovementioned pair of bolt holes 9, and also, in addition thereto, bolt holes 11 are provided below the first reference members 10. And, in a similar manner to the case with the work pallet 3 of the first embodiment, along with first and second annular engagement members 30, 40 being provided to the work pallet 3C, also, in addition thereto, a further pair of first annular engagement members 30 are provided corresponding to the added pair of first reference members 10 described above. The other structures are the same as in the first embodiment, and accordingly similar reference symbols are appended to them as in the case of the first embodiment, with explanation being omitted.

Embodiment 5

Figure 23:
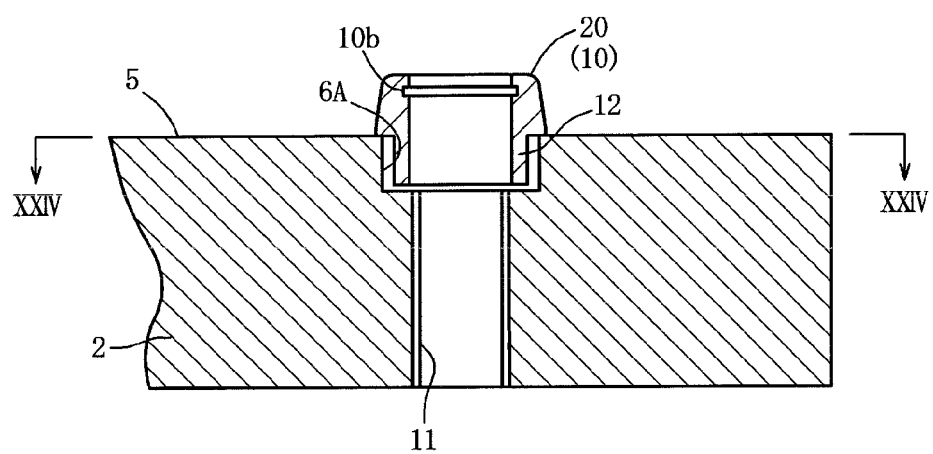
FIG. 23 is a sectional view of a base member and an annular engagement member according to a fifth embodiment.
Figure 24:
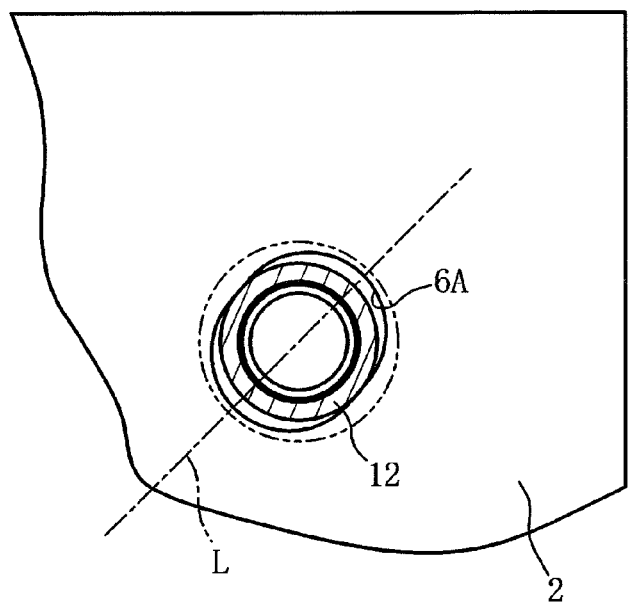
FIG. 24 is a sectional view taken along lines XXIV-XXIV of FIG. 23.

As shown in FIGS. 23 and 24, a structure having the same construction as the first reference member 10 is employed as the second reference member 20, and the fitting hole 6A into which its fitting cylindrical portion 12 is fitted is formed as an elliptically shaped fitting hole having its long axis in the direction of the center line L that joins the axes of the first and second reference members 10, 20. Since the fitting cylindrical portion 12 (in other words, the second reference member 20) can be shifted slightly in the direction of the center line L via this elliptically shaped fitting hole 6A, accordingly it is possible to absorb any manufacturing error in the work pallet 3 with respect to the base member 2 (for example, an error of a few μm to a few tens of μm.) This is beneficial, since only one type of reference member need be provided. The other structures are the same as in the first embodiment.

Embodiment 6

Figure 25:
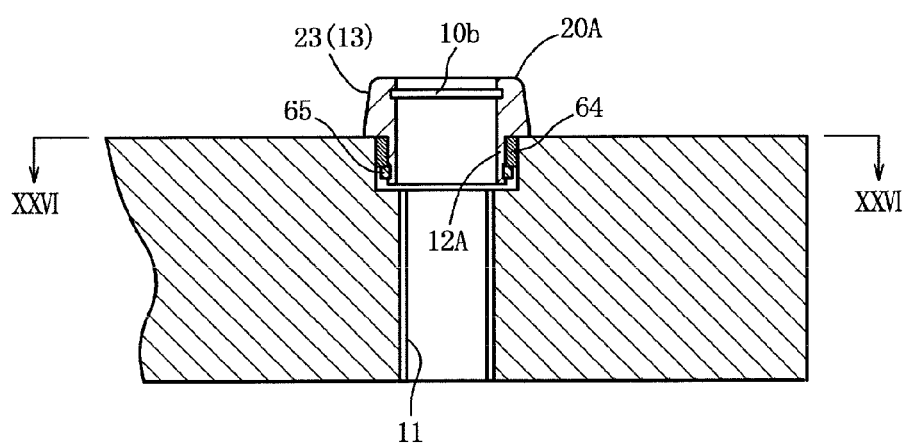
FIG. 25 is a sectional view of a base member and an annular engagement member according to a sixth embodiment (and is a sectional view taken along lines XXV-XXV of FIG. 26)
Figure 26:
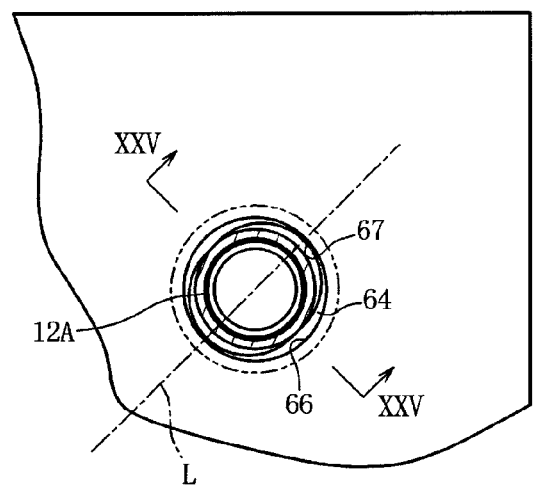
FIG. 26 is a sectional view taken along lines XXVI-XXVI of FIG. 25.

As shown in FIGS. 25 and 26, the engagement projection 23 of the second reference member 20A is formed to have the same shape as the engagement projection 13 of the first reference member 10, and a bush 64 is installed to the fitting cylindrical portion 12A of the second reference member 20A, with the bush 64 being retained by a stop ring 65. As seen in plan view, the external shape of the bush 64 is circular, and the fitting cylindrical portion 12A and the bush 64 are fitted into a circular fitting hole 66 in the base member 2. And an elliptically shaped hole 67 is formed in the bush 64, having its long axis along the direction of the center line L. Since it is possible to shift the fitting cylindrical portion 12A slightly along the direction of the center line L via the elliptically shaped hole 67, accordingly it is possible to absorb any manufacturing error in the work pallet 3 with respect to the base member 2. The other structures are the same as in the first embodiment.

Embodiment 7

Figure 27:
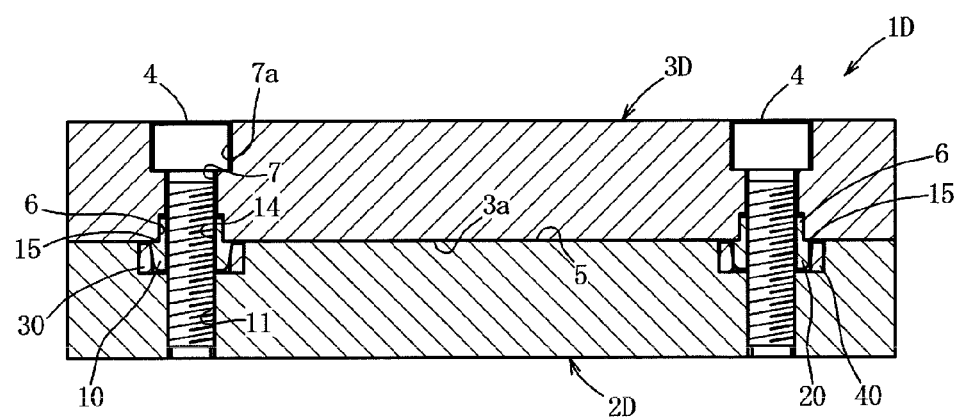
FIG. 27 is a figure corresponding to FIG. 5, for a pallet positioning and fixing device according to a seventh embodiment.

With the pallet positioning and fixing device 1D shown in FIG. 27, first and second reference members 10, 20 are installed in fitting holes 6 that are formed in the work pallet 3D, and first and second annular engagement members 30, 40 are provided to the base member 2D. In this case, bolt insertion holes 7 and head portion reception apertures 7a are formed in the work pallet 3D at positions corresponding to the first and second reference members 10, 20, and bolt insertion holes 14 are formed in the first and second reference members 10, 20, with bolt holes 11 that communicate with the bolt insertion holes 14 of the first and second reference members 10, 20 being formed in the base member 2D. The other structures are the same as in the first embodiment.

Next, examples in which the embodiments described above are partially altered will be explained.

(1) As shown in FIG. 28, it would also be acceptable to provide a structure in which bolt holes 14a are formed in the upper half portions of the bolt insertion holes 14 of the first and second reference members 10, 20, and, when the first and second reference members 10, 20 are to be exchanged, for bolts 70 for removal to be inserted into the bolt holes 14a and to be screwed inward, thus removing the first and second reference members 10, 20 by driving these bolts 70 to exert upward pulling force.

Figure 29:
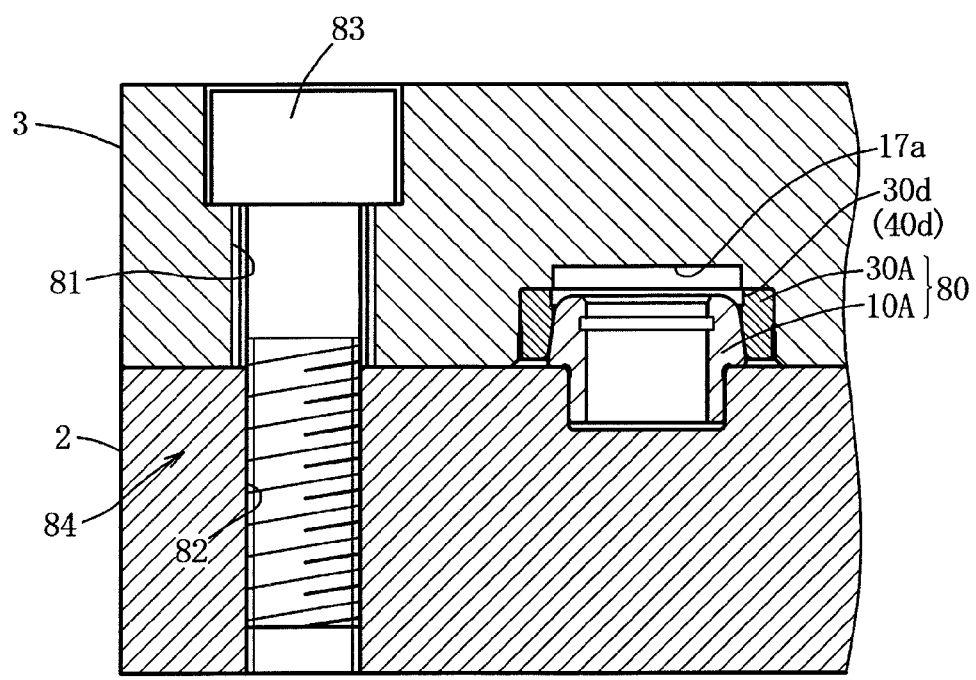
FIG. 29 is a sectional view of essential portions of a base member, a reference member, and an annular engagement member according to another variant embodiment.

(2) As shown in FIG. 29, a positioning mechanism 80 including a reference member 10A and an annular engagement member 30A is provided, and along with a bolt insertion hole 81 being formed in the work pallet 3 at a location in the vicinity of the positioning mechanism 80, a bolt hole 82 is formed in the base member 2 to correspond to the bolt insertion hole 81, and the work pallet 3 is fixed to the base member 2 by a fixing bolt 83 being passed through the bolt insertion hole 81 and being screwingly engaged into the bolt hole 82. The bolt insertion hole 81 and the bolt hole 82 constitute a fixing mechanism 84, and the positioning mechanism 80 and the fixing mechanism 84 described above constitute a positioning and fixing mechanism.

It should be understood that the bolt insertion hole 81 is formed as a bolt hole that is capable of passing the bolt 83, and, when the engagement of the reference member 10A and the annular engagement member 30A is to be released, a bolt for engagement release (not shown in the figure) is engaged into the bolt insertion hole 81 and is screwed thereinto, and, in the state in which the end of this bolt is contacted against the base member 2, a reaction force is generated, so that the engagement described above is released.

Figure 7:
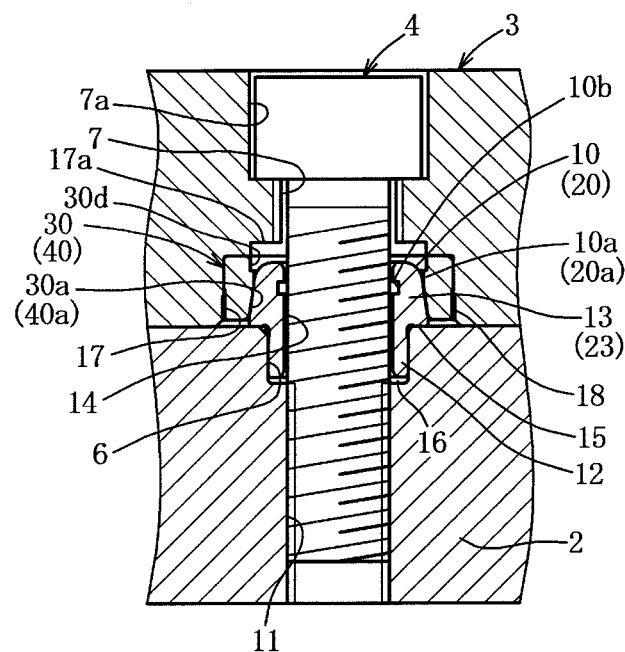
FIG. 7 is an enlarged view of essential portions of FIG. 5 and FIG. 6.
Figure 8:
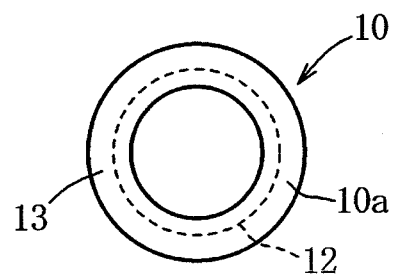
FIG. 8 is a plan view of a first reference member.
Figure 9:
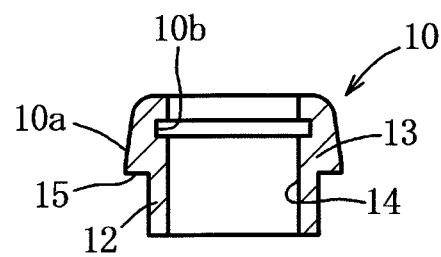
FIG. 9 is a sectional view of the first reference member.
Figure 10:
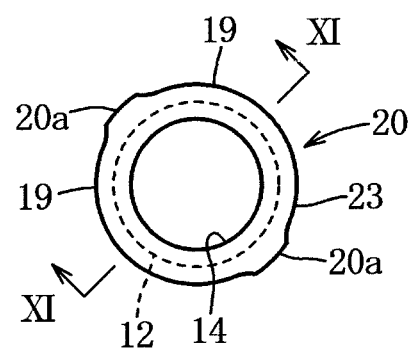
FIG. 10 is a plan view of a second reference member.
Figure 11:
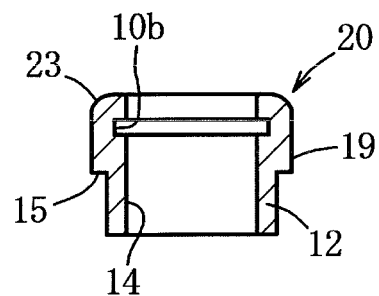
FIG. 11 is a sectional view taken along lines XI-XI of FIG. 10.
Figure 12:
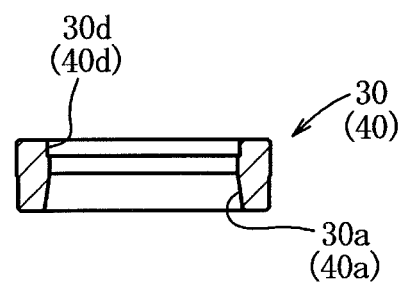
FIG. 12 is a sectional view of an annular engagement member.

(3) When positioning and fixing a compact target object, it would be possible to perform the positioning and fixing by employing a pair of positioning and fixing mechanisms consisting of a reference member 10 and an annular engagement member 30 as shown in FIG. 7. Or, alternatively, it would also be possible to employ a pair of the positioning and fixing mechanisms shown in FIG. 29.

(4) It is not necessary for the reference seating surface 5 to be formed over the entire area of the upper surface of the base member 2; it would also be acceptable to arrange to form it at a plurality of locations on the upper surface of the base member 2. In a similar manner, it is not necessary for the contacting surface 3a that contacts against the reference seating surface 5 to be formed over the entire area of the lower surface of the work pallet 3; it would also be acceptable to arrange to form it at a plurality of locations on the lower surface of the work pallet 3.

(5) It would also be acceptable to arrange for the head portions of the bolts 4, 4A not to be received in the head portion reception apertures, but rather to project from the upper surface of the work pallet 3.

(6) Since, in some cases, the reference members 10, 20 and annular engagement members 30, 40 will not be exchanged, it would also be acceptable to arrange to omit the stop ring grooves 10b, 30d, 40d and the circular concave depression 17a, because they are not essential features.

(7) The target object described above is not limited to being a work pallet 3; it would also be possible to apply the present invention to a device that positions and fixes articles, members, tools, or the like of various types. For example, the present invention could also be applied to a structure that positions and fixes, on a base member, a claw member (a target object) of a vice that fixes a workpiece or the like. Moreover, the present invention could also be applied to a structure that positions and fixes a claw member (a target object) of a chuck device of a lathe.

In the technical fields corresponding to a work pallet, a vice mechanism, a chuck mechanism, and so on, the object positioning and fixing device according to the present invention can be applied to various mechanisms that position and fix a target object on a base member.

DESCRIPTION OF NUMERALS

1, 1D: pallet positioning and fixing devices
2, 2A~2D: base members
3, 3B~3D: work pallets
3a: contacting surface
4: bolts
5: reference seating surface
6: fitting hole
7, 8: bolt insertion holes
7a, 8a: head portion reception apertures
9, 11: bolt holes
10, 20: reference members
10a, 20a: tapered engagement surfaces
10b: stop ring groove
12: fitting cylindrical portion
13, 23: engagement projections
15: base end contacting surface
17: installation hole
17a: circular concave hole
18: annular clearance
30, 40: annular engagement members
30a, 40a: tapered contacting surfaces
30b, 40b: annular grooves
30d, 40d: stop ring grooves

The invention claimed is:
1. An object positioning and fixing device that positions and fixes a target object on a base member in a horizontal direction and in a vertical direction, comprising:
said base member comprises a reference seating surface for positioning in the vertical direction, and said target object comprises a contacting surface that can contact against said reference seating surface;
said base member comprises a fitting hole that is formed to open to said reference seating surface, and a reference member that is fixed in said fitting hole;
said target object comprises an installation hole that is formed to open to said contacting surface at a position corresponding to said reference member, and an annular engagement member that is fixed in said installation hole;

said reference member comprises a fitting cylindrical portion that is fitted into and fixed in said fitting hole, an engagement projection that is formed integrally with said fitting cylindrical portion so as to have a larger external diameter than said fitting cylindrical portion and a smaller diameter than said annular engagement member and that projects from said reference seating surface toward said target object, a tapered engagement surface that is formed on at least a portion of an external peripheral surface of said engagement projection and whose diameter becomes smaller towards said target object, and a base end contacting surface that is formed on a base end of said fitting cylindrical portion side of said engagement projection so as to have a smaller external diameter than that of said annular engagement member and that contacts against said reference seating surface; and said annular engagement member comprises a tapered contacting surface that, when said base end contacting surface is contacted against said reference seating surface, can engage in a tightly contacting state with said tapered engagement surface of said engagement projection, via elastic deformation in a radially outward direction of said annular engagement member.

2. An object positioning and fixing device according to claim 1, wherein said reference member is one of a plurality of reference members provided at mutually separated positions, and wherein, respectively corresponding to said plurality of reference members, a plurality of said fitting holes, a plurality of said installation holes, and a plurality of said annular engagement members are provided.

3. An object positioning and fixing device according to claim 1, wherein a concave circular depression that communicates with said installation hole is formed at an interior portion of said installation hole, and a stop ring groove is formed around inner periphery of said annular engagement member.

4. An object positioning and fixing device according to claim 1, wherein the tapered engagement surface whose diameter becomes smaller towards said target object extends from said base end contacting surface to an opposite end of said engagement projection which is opposite said base end, said tapered engagement surface tapering in external diameter all along an entire length of said engagement projection from said base end to said opposite end.

5. An object positioning and fixing device according to claim 1, wherein an annular clearance for promoting elastic deformation of the annular engagement member in the radially outward direction is defined at least at a portion between an external peripheral surface of said annular engagement member and an inner peripheral surface of said installation hole.

6. An object positioning and fixing device according to claim 1, wherein an annular groove that opens toward said reference seating surface is formed in said annular engagement member for promoting elastic deformation thereof in its radially outward direction.

7. An object positioning and fixing device that positions and fixes a target object on a base member in a horizontal direction and in a vertical direction, comprising:

said base member comprises a reference seating surface for positioning in the vertical direction, and said target object comprises a contacting surface that can contact against said reference seating surface;

one of said base member and said target object comprises a fitting hole that is formed to open to said reference seating surface of to said contacting surface, and a reference member that is fixed in said fitting hole;

the other of said base member and said target object comprises an installation hole that is formed to open to said contacting surface of to said reference seating surface at a position corresponding to said reference member, and an annular engagement member that is fixed in said installation hole;

said reference member comprises a fitting cylindrical portion that is fitted into and fixed in said fitting hole, an engagement projection that is formed integrally with said fitting cylindrical portion so as to have a larger external diameter than said fitting cylindrical portion and that projects from said reference seating surface or said contacting surface toward said other, a tapered engagement surface that is formed on at least a portion of an external peripheral surface of said engagement projection and whose diameter becomes smaller towards said other, and a base end contacting surface that is formed on a base end of said fitting cylindrical portion side of said engagement projection so as to have a smaller external diameter than that of said annular engagement member and that contacts against said reference seating surface or said contacting surface; and said annular engagement member comprises a tapered contacting surface that, when said contacting surface is contacted against said reference seating surface, can engage in a tightly contacting state with said tapered engagement surface of said engagement projection, via elastic deformation of said annular engagement member or of said engagement projection; and wherein an annular clearance for promoting elastic deformation of the annular engagement member in the radially outward direction is defined at least at a portion between an external peripheral surface of said annular engagement member and an inner peripheral surface of said installation hole.

8. An object positioning and fixing device that positions and fixes a target object on a base member in a horizontal direction and in a vertical direction, comprising:

said base member comprises a reference seating surface for positioning in the vertical direction, and said target object comprises a contacting surface that can contact against said reference seating surface;

one of said base member and said target object comprises a fitting hole that is formed to open to said reference seating surface or to said contacting surface, and a reference member that is fixed in said fitting hole;

the other of said base member and said target object comprises an installation hole that is formed to open to said contacting surface or to said reference seating surface at a position corresponding to said reference member, and an annular engagement member that is fixed in said installation hole;

said reference member comprises a fitting cylindrical portion that is fitted into and fixed in said fitting hole, an engagement projection that is formed integrally with said fitting cylindrical portion so as to have a larger external diameter than said fitting cylindrical portion and that projects from said reference seating surface or said contacting surface toward said other, a tapered engagement surface that is formed on at least a portion of an external peripheral surface of said engagement projection and whose diameter becomes smaller towards said other, and a base end contacting surface that is formed on a base end of said fitting cylindrical portion side of said engagement projection so as to have a smaller external diameter than that of said annular engagement member and that contacts against said reference seating surface or said contacting surface; and said annular engagement member comprises a tapered contacting surface that, when said contacting surface is contacted against said reference seating surface, can engage in a tightly contacting state with said tapered engagement surface of said engagement projection, via elastic deformation of said annular engagement member or of said engagement projection; and wherein an annular groove that opens toward said reference seating surface or toward said contacting surface is formed in said annular engagement member for promoting elastic deformation thereof in its radially outward direction.

9. An object positioning and fixing device that positions and fixes a target object on a base member in a horizontal direction and in a vertical direction, comprising:

said base member comprises a reference seating surface for positioning in the vertical direction, and said target object comprises a contacting surface that can contact against said reference seating surface;

one of said base member and said target object comprises a fitting hole that is formed to open to said reference seating surface or to said contacting surface, and a reference member that is fixed in said fitting hole;

the other of said base member and said target object comprises an installation hole that is formed to open to said contacting surface or to said reference seating surface at a position corresponding to said reference member, and an annular engagement member that is fixed in said installation hole;

said reference member comprises a fitting cylindrical portion that is fitted into and fixed in said fitting hole, an engagement projection that is formed integrally with said fitting cylindrical portion so as to have a larger external diameter than said fitting cylindrical portion and that projects from said reference seating surface or said contacting surface toward said other, a tapered engagement surface that is formed on at least a portion of an external peripheral surface of said engagement projection and whose diameter becomes smaller towards said other, and a base end contacting surface that is formed on a base end of said fitting cylindrical portion side of said engagement projection so as to have a smaller external diameter than that of said annular engagement member and that contacts against said reference seating surface or said contacting surface;

said annular engagement member comprises a tapered contacting surface that, when said contacting surface is contacted against said reference seating surface, can engage in a tightly contacting state with said tapered engagement surface of said engagement projection, via elastic deformation of said annular engagement member or of said engagement projection; and wherein said reference member comprises a first bolt insertion hole, said target object comprises a second bolt insertion hole corresponding to said first bolt insertion hole, said base member comprises a first bolt hole corresponding to said first and second bolt insertion holes, and a first bolt is provided that is passed from above said target object through said first and second bolt insertion holes and is screwingly engaged in said first bolt hole.

10. An object positioning and fixing device according to claim 9, wherein said target object comprises a third bolt insertion hole that is different from said second bolt insertion hole, said base member comprises a second bolt hole corresponding to the third bolt insertion hole, and a second bolt is provided that is passed from above said target object through said third bolt insertion hole and is screwingly engaged in said second bolt hole.

11. An object positioning and fixing device according to claim 10, wherein head portion reception apertures that respectively contain head portions of the first and second bolts are formed in the upper portions of said second and third bolt insertion holes.

12. An object positioning and fixing device according to claim 9, wherein said second bolt insertion hole is made as a bolt hole that is larger in diameter than said first bolt insertion hole, and that can allow said first bolt to pass through.

13. An object positioning and fixing device according to claim 9, wherein a stop ring groove is formed in said first bolt insertion hole.

* * * * *